US005080745A

United States Patent [19]

Paull

[11] Patent Number: 5,080,745

[45] Date of Patent: Jan. 14, 1992

[54] TONER BIN SEAL AND SEALING METHOD

[76] Inventor: Leslie Paull, 6706 Bridge Hill, Austin, Tex. 78746

[21] Appl. No.: 529,396

[22] Filed: May 29, 1990

[51] Int. Cl.[5] .............................................. B32B 31/00

[52] U.S. Cl. ............................. 156/247; 222/DIG. 1; 229/123.1; 355/260

[58] Field of Search ........................ 156/247; 355/260; 206/633; 222/DIG. 1; 229/123.1; 141/348

[56] References Cited

U.S. PATENT DOCUMENTS

| | | | |
|---|---|---|---|
| 3,999,654 | 12/1976 | Pollack | 206/633 X |
| 4,062,385 | 12/1977 | Katusha et al. | 222/DIG. 1 X |
| 4,491,161 | 1/1985 | Tamura et al. | 355/260 X |
| 4,573,614 | 3/1986 | Ozawa | 206/633 X |
| 4,589,579 | 5/1986 | Morita | 222/DIG. 1 X |
| 4,981,218 | 1/1991 | Ban et al. | 355/260 X |
| 4,984,023 | 1/1991 | Yoshida | 355/260 |

*Primary Examiner*—David A. Simmons
*Assistant Examiner*—J. Sells
*Attorney, Agent, or Firm*—J. Nevin Shaffer, Jr.; Russell D. Culbertson

[57] ABSTRACT

A seal is adapted for temporarily but securely sealing a toner bin, and particularly, a toner bin having a container with a container opening, a sealing surface formed around the container opening, and a container cover structure connected to the container over the container opening so as to form a narrow slot exposed along one side of the toner bin at a slot opening. The seal includes a sealing sheet adapted to be inserted through the slot opening in an inserted position in which the sealing sheet completely covers the container opening and a portion of the container sealing surface around the entire perimeter of the container opening. The sealing sheet includes an adhesive coating positioned on a sealing side thereof, and has an insertion edge at one end and a trailing edge at its opposite end. An adhesive protecting sheet is secured over the adhesive coating on the sealing sheet and includes a first edge generally aligned with the insertion edge of the sealing sheet and a second edge generally aligned with the trailing edge of the sealing sheet. An adhesive exposing member is connected to the first edge of the adhesive protecting sheet and is adapted to be folded over the adhesive protecting sheet from its first edge and to extend out of the toner bin slot opening when the sealing sheet is in the inserted position. With the sealing sheet in the inserted position, the adhesive coating on the sealing sheet may be exposed to form a seal with the container sealing surface by pulling the adhesive exposing member out of the toner bin slot through the slot opening.

19 Claims, 6 Drawing Sheets

TONER BIN SEAL AND SEALING METHOD

BACKGROUND OF THE INVENTION

This invention relates to seals for temporarily sealing a toner bin or the like, and particularly, to a toner bin seal for use in sealing the toner container or hopper of a xerographic printer or copier cartridge. The invention also encompasses a method for providing a secure temporary seal for a toner bin container or the like.

Many xerographic devices including laser printers and small copiers utilize cartridges that contain a supply of xerographic toner material. These cartridges must be replaced from time to time as the toner is used up in the xerographic process. The cartridges commonly include the xerographic magnetic roller assembly and a toner bin assembly with a container or hopper for containing the required supply of toner material. The roller assembly is positioned above an opening in the toner container in position to pick up toner material from the container as required by the particular xerographic device in which the cartridge is used. Although, the toner in the toner bin container must be exposed to the magnetic roller in order for the xerographic device to operate properly, the toner comprises a fine powder material and must be sealed in the toner container or hopper for shipping and handling.

The toner container seals provided by cartridge manufacturers are commonly placed in a narrow slot formed between the container and a structure connected over the container opening that holds the magnetic roller assembly. The seal is formed in the cartridge manufacturing process before any toner is placed into the toner container. A slot opening is provided along one edge of the container by which the original seal may be easily removed prior to installing the cartridge in the particular xerographic device.

Although printer and copier cartridges were commonly designed to be discarded after the original toner supply was exhausted, the magnetic roller and other mechanisms in the cartridges have useful lives substantially longer than the toner life. Thus, the cartridges could be recharged or refilled with a supply of toner and reused several times. However, the restricted access to the slot formed over the container opening made it difficult to provide an effective seal when a used cartridge was recharged with toner. Imperfect seals over the refilled toner containers resulted in substantial loss of toner during shipment and handling and gave the recharged cartridges a shorter life span.

Prior to the present invention, various types of separator cards were employed to reduce the loss of toner during shipment. The separator cards were inserted into the toner bin slot through the slot opening so as to substantially cover the container opening. Although, the separator cards did cover or block the majority of the toner container opening, they did not provide an actual seal around the toner container or hopper opening. Some separator cards were formed from a plastic material and were adapted to rest more or less loosely in the slot. Other separator cards were provided with magnetic properties that drew the separator card material against the container opening for reducing leakage. However, even the magnetic separator cards did not provide a complete seal and did allow substantial amounts of toner to escape from the toner container during shipment and handling. In addition to the plain plastic and magnetic separator cards, one separator card sold under the trademark FIRMLOCK included an arrangement for biasing the separator card material against the material around the opening of the toner container. However, these biased separator cards were difficult to insert and also failed to provide a complete seal.

SUMMARY OF THE INVENTION

It is therefore an object of the invention to provide a toner bin seal adapted to overcome the above-mentioned problems and others associated with prior devices for retaining toner in the toner container during shipment and handling. It is also an object of the invention to provide a method for providing a toner bin seal for securely but temporarily sealing toner in the toner container of a xerographic printer or copier cartridge.

A toner bin seal according to the invention includes a sealing sheet, an adhesive coating positioned on a sealing side of the sealing sheet, an adhesive protecting sheet covering the adhesive coating, and an adhesive exposing member connected to the adhesive protecting sheet. The sealing sheet, with the adhesive coating, protecting sheet and adhesive exposing member attached thereto, is adapted to be inserted into the toner bin slot of a printer or copier cartridge through the slot opening to an inserted position. In the inserted position the sealing sheet completely covers the toner container opening and at least a portion of the sealing surface extending around the container opening, with the sealing side of the sealing sheet facing the container sealing surface. With the sealing sheet in the inserted position, the adhesive exposing member is adapted to extend out of the slot opening in position to be pulled from the slot opening to remove the adhesive protecting sheet and expose the adhesive coating. The exposed adhesive coating then contacts the container sealing surface to form a complete seal between the container sealing surface and the sealing sheet. This complete seal prevents toner from escaping from the toner container as the cartridge is shipped and handled prior to being installed in its particular xerographic device.

In the preferred form of the invention the sealing sheet is made of a thin flexible material and the seal according to the invention includes a sealing sheet removing member connected to the sealing sheet. The sealing sheet removing member is adapted for helping to remove the sealing sheet before the cartridge is installed in a xerographic device. When the sealing sheet is in the inserted position the sealing sheet removing member is adapted to extend out of the toner bin slot through the slot opening. The portion of the sealing sheet removing member that extends out of the slot opening may be grasped and pulled to pull the member and the sealed sealing sheet from the slot.

The preferred sealing sheet is made of a thin sheet of polyvinyl chloride plastic and is sized to fit in a particular toner bin slot through the slot opening and to cover not only the container opening, but also a portion of the container sealing surface around the entire perimeter of the container opening. In most current toner bins the toner container opening is elongated and generally rectangular in shape, and the slot opening is at one end of the elongated container. Thus, the sealing sheet for these common toner bins is elongated and generally rectangular in shape with an insertion end and edge adapted to be inserted first through the slot opening and a trailing end and edge that is positioned near the slot opening when the sealing sheet is in the inserted position.

The preferred sealing sheet removing member is connected to the sealing sheet at its insertion end and is substantially longer than the elongated sealing sheet. Specifically, the sealing sheet removing member has sufficient length to be folded back from the insertion end of the sealing sheet and to extend a substantial distance out of the toner bin slot opening when the sealing sheet is in the inserted position. The portion extending out of the slot opening may be grasped and pulled to peel the sealed sealing sheet back from its insertion end, breaking the seal with the container sealing surface and removing the sealing sheet so that the toner bin may be used in its particular xerographic device. In the preferred form of the invention, the sealing sheet removing member is integrally formed with the sealing sheet and comprises an extension of the sealing sheet material having the same width as the sealing sheet itself.

The adhesive coating according to the invention may be any suitable low-tack adhesive material adapted to readily release from the container sealing surface when the sealing sheet is peeled back with the sealing sheet removing member or simply pulled from the slot through the slot opening. The adhesive coating may be applied to the sealing sheet in any suitable manner and is adapted to remain on the sealing sheet when the adhesive protecting sheet is removed.

The preferred adhesive protecting sheet also comprises a thin sheet of a suitable flexible plastic such as polyvinyl chloride. In the preferred form of the invention the adhesive protecting sheet is substantially the same size and shape as the sealing sheet and includes a first end and edge aligned with the sealing sheet insertion end and edge, and a second end and edge aligned with the sealing sheet trailing end and edge.

The adhesive exposing member is preferably connected to the first edge of the adhesive protecting sheet and is also made of a thin flexible material. The adhesive exposing member also has sufficient length to be folded back from the first edge of the adhesive protecting sheet so as to extend the length of the adhesive protecting sheet and substantially out of the slot opening when the sealing sheet is in the inserted position. The portion of the adhesive exposing member extending out of the slot opening may be grasped and pulled from the slot opening to peel back the adhesive protecting sheet from the insertion end of the sealing sheet to expose the adhesive coating. The exposed adhesive coating may then adhere the sealing sheet to the container sealing surface to form the desired seal over the toner container.

The method of providing a toner bin seal according to of the invention includes the step of inserting the seal into the toner bin slot through the slot opening to a inserted position in which the sealing side and adhesive coating faces the container sealing surface and the insertion end of the sealing sheet is at the end of the slot opposite to the end in which the slot opening is formed. In this inserted position the trailing end of the sealing sheet is at the end of the slot having the slot opening. The method further includes peeling the adhesive protecting sheet back from the insertion end of the sealing sheet to expose the adhesive coating and then pressing the sealing sheet against the sealing surface of the container to form the desired seal between the sealing sheet material and the sealing surface around the entire periphery of the container opening.

In the preferred form of the invention both the sealing sheet and the adhesive protecting sheet are comprised of thin flexible material and are not sufficiently rigid to be inserted through the narrow container slot by themselves. With this preferred form of seal, the sealing method includes positioning the seal on an insertion tool made of a substantially rigid material and then inserting the seal to the inserted position using the insertion tool. The insertion tool preferably has an insertion portion having substantially the same width as the sealing sheet but being somewhat longer and including a handle portion adapted to extend out of the slot opening when the seal is placed in the inserted position.

The method of inserting the seal with the insertion tool preferably includes first positioning the seal on the insertion tool with the sealing side of the sealing sheet and the adhesive coating deposited thereon facing away from the insertion tool. The method next includes folding the adhesive exposing member first move both the insertion end of the sealing sheet and the end of the insertion tool, and then back over the insertion end of the sealing sheet and the tool end so that the adhesive exposing member extends along the entire length of the adhesive protecting sheet and somewhat beyond its second end. Once the insertion tool and seal are inserted into the slot so that the sealing sheet is in the inserted position covering the container opening and a portion of the sealing surface, the step of peeling the adhesive protecting sheet back includes pulling the adhesive exposing member from the slot through the slot opening while holding the sealing sheet in place with the insertion tool. The preferred step of pressing the sealing sheet and exposed adhesive coating against the container sealing surface is then performed with the insertion tool.

Where the seal according to the invention includes a sealing sheet removing member, the method of the invention includes folding the sealing sheet removing member over the end of the insertion tool prior to inserting the sealing sheet into the toner bin slot. As discussed above the sealing sheet removing member has sufficient length to extend back the length of the sealing sheet and the insertion portion of the insertion tool so that it is exposed out of the slot opening when the sealing sheet is placed in the inserted position in the container slot. The exposed sealing sheet removing member may then be used to peel the sealing sheet from its sealed position to remove the preferred flexible sealing sheet from the slot and to expose the toner material in the container prior to use in the particular xerographic device.

These and other objects, advantages, and features of the invention will be apparent from the following description of the preferred embodiments, considered along with the accompanying drawings.

DESCRIPTION OF THE PREFERRED EMBODIMENTS

Figure 1:
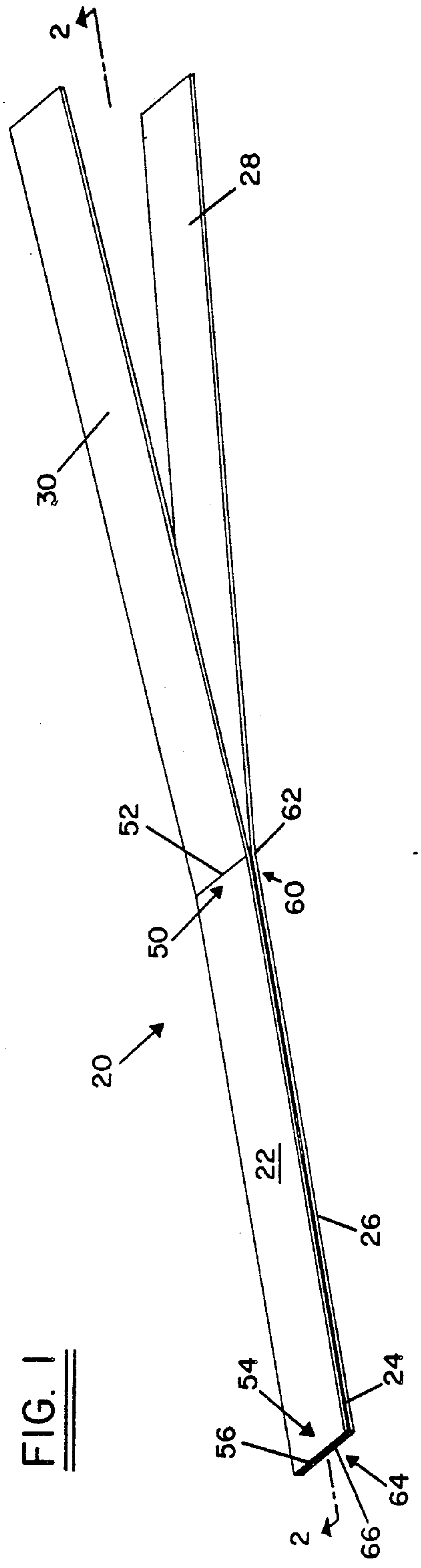
FIG. 1 is a view in perspective of a toner bin seal embodying the principles of the invention drawn to a somewhat exaggerated vertical scale.

FIGS. 1 through 4 and 6 through 9 illustrate by way of example one preferred form of toner bin seal 20 embodying the principles of the invention. The toner bin seal 20 includes a sealing sheet 22, an adhesive coating 24 positioned on the sealing sheet, and an adhesive protecting sheet 26. An adhesive exposing member 28 is connected to one end of the adhesive protecting sheet 26 and a sealing sheet removing member 30 is connected to one end of the sealing sheet 22.

Figure 5:
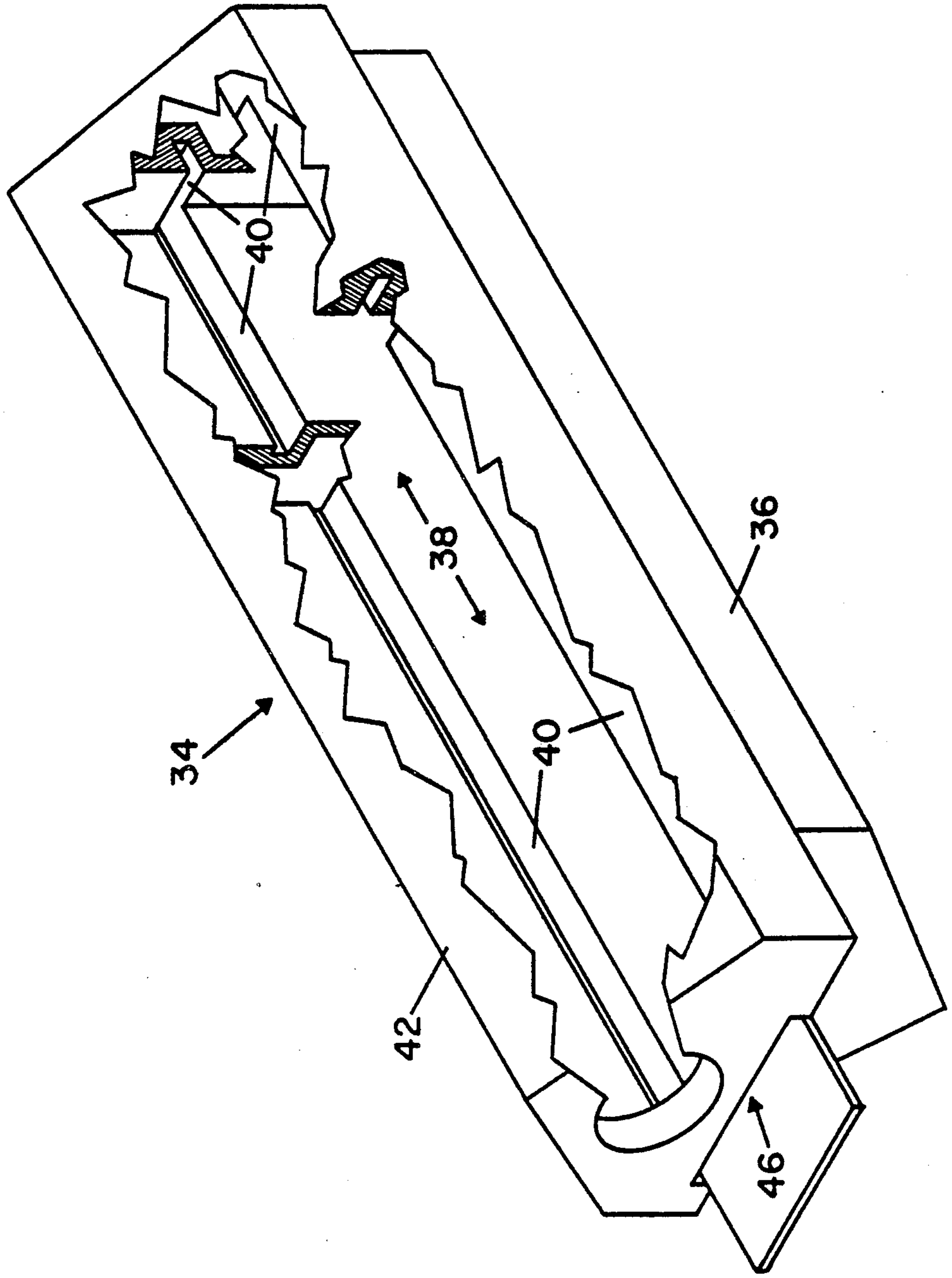
FIG. 5 (PRIOR ART)
FIG. 5 is a partially cut-away view in perspective of a toner bin with which the seal shown in FIGS. 1-4 is adapted to be used.
Figure 6:
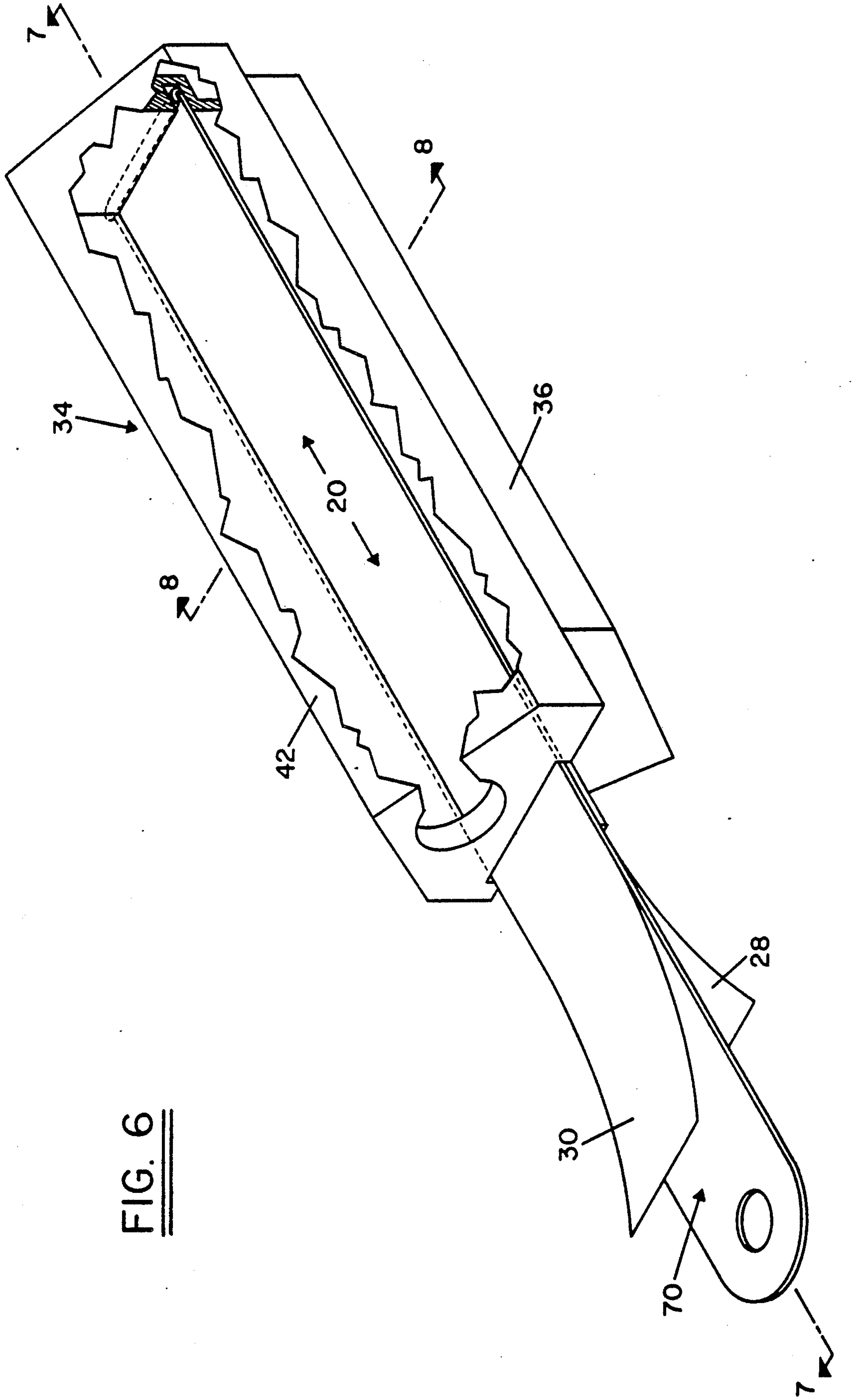
FIG. 6 is a view in perspective of the toner bin shown in FIG. 5 with the seal shown in FIGS. 1-4 in the inserted position according to the method of the invention.

The toner bin seal 20 is specifically adapted for providing a seal for the toner container in a toner bin 34 illustrated in FIGS. 5 through 9. The illustrated toner bin 34 forms part of a toner cartridge (not shown) that is adapted for use in xerographic devices such as copying machines and laser printers (not shown). Referring particularly to FIGS. 5 and 6, the toner bin 34 includes a toner container or hopper 36 adapted to contain a supply of toner material (not shown) for use in a xerographic process. The toner container 36 has an elongated container opening 38 with a sealing surface 40 formed around the periphery of the opening which accommodates the seal provided by the toner bin manufacturer (not shown). The toner bin 34 also includes a structure 42 connected to the container 36 so as to cover the container opening 38 and forming a narrow slot 44 shown best in FIG. 7 above the container sealing surface 40 with a slot opening 46 at one end. The container covering structure 42 houses a magnetic roller (not shown) used to pick up toner from the toner container 36 in the xerographic printing process.

Figure 2:
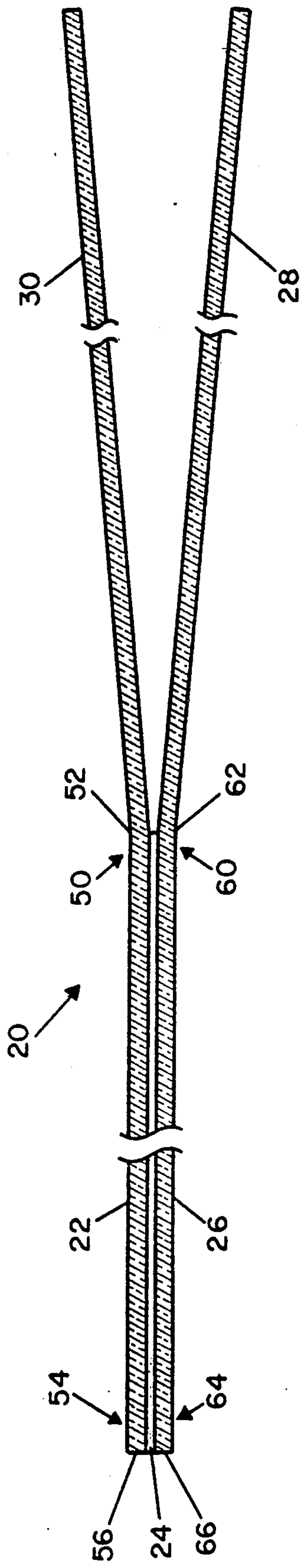
FIG. 2 is a view in longitudinal section taken along line 2—2 in FIG. 1 and drawn to a further exaggerated vertical scale.

Referring now to FIGS. 1 and 2 the sealing sheet 22 comprises a thin elongated sheet of material having an insertion end 50 and edge 52 and a trailing end 54 and edge 56. Although the thickness requirements of the sealing sheet 22 may vary depending upon the particular toner bin with which it is to be used, the sheet may preferably be approximately 1 to 3 mils thick. The width and length of the sealing sheet 22 are dictated by the size of the particular toner bin with which it is to be used. That is, the sealing sheet must be sized so that it is capable of being inserted into the container slot, such as the slot 44 in FIG. 7, through the slot opening 46 to an inserted position in which the sealing sheet completely covers the container opening 38 and at least a portion of the sealing surface 40 around the entire periphery of the opening. The preferred sealing sheet 22 is made of polyvinyl chloride plastic although a number of different types of material may be employed.

The adhesive coating 24 comprises a low-tack adhesive material positioned on a sealing side of the sealing sheet 22 in at least those areas of the sealing sheet that align with the container sealing surface 40 when the sealing sheet is placed in the inserted position in the toner bin slot 44. In the preferred form of the invention, the adhesive coating material is applied to the entire sealing side of the sealing sheet for ease of manufacture. Substantially any low-tack adhesive material that is compatible with the sealing sheet material and the container sealing surface, and is capable of remaining in place a the adhesive protecting sheet is removed, may be employed as the adhesive coating according to the invention. Although a number of adhesive materials may meet these requirements, Adhesive No. 467 produced by Minnesota Mining and Manufacturing Company is the currently preferred form of adhesive.

The adhesive protecting sheet 26 is comprised of a thin flexible sheet of material having sufficient size and shape to just cover all of the adhesive coating 24 positioned on the sealing sheet 22. The adhesive protecting sheet includes a first end 60 and edge 62 adapted to align with the insertion end and edge, 50 and 52 respectively, of the sealing sheet 22, and a second end 64 and edge 66 aligned with the trailing end 54 and edge 56 of the sealing sheet. In the preferred form of the invention, the adhesive protecting sheet 26 is made from the same polyvinyl chloride plastic material used to form the sealing sheet 22, although different types of material may be used according to the invention.

Figure 3:
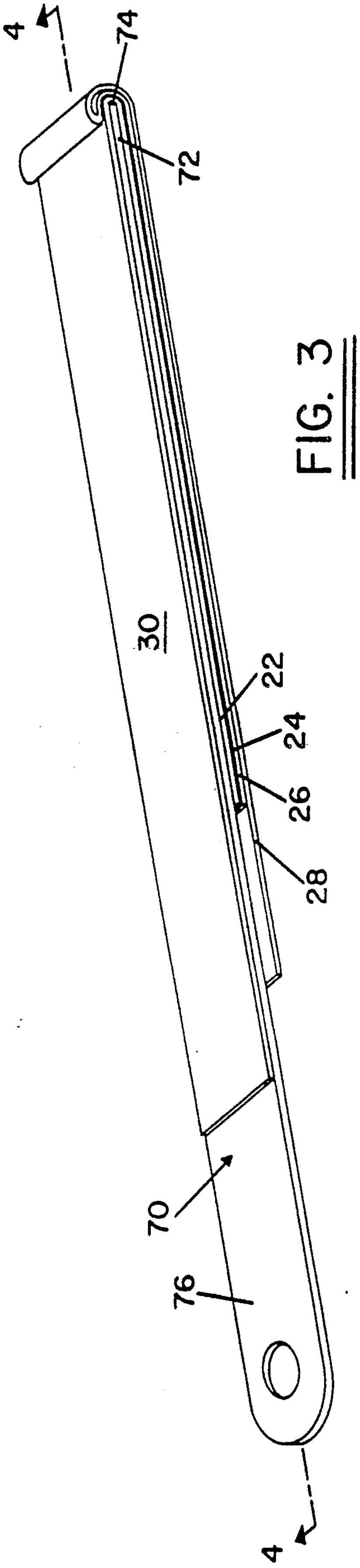
FIG. 3 is a view in perspective of the toner bin seal shown in FIG. 1 positioned on an insertion tool pursuant to the method of the invention.
Figure 4:
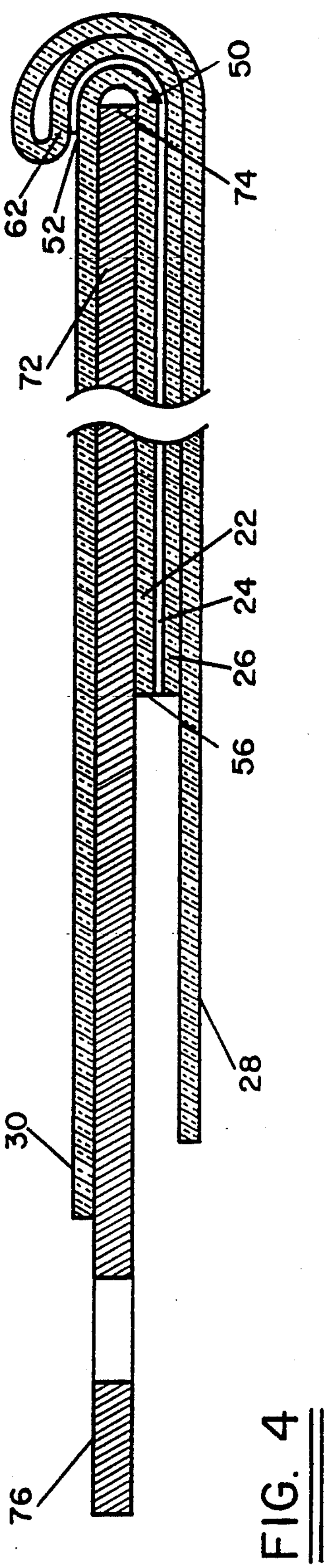
FIG. 4 is a view in longitudinal section taken along line 4—4 in FIG. 3 and drawn to a further exaggerated vertical scale.
Figure 7:
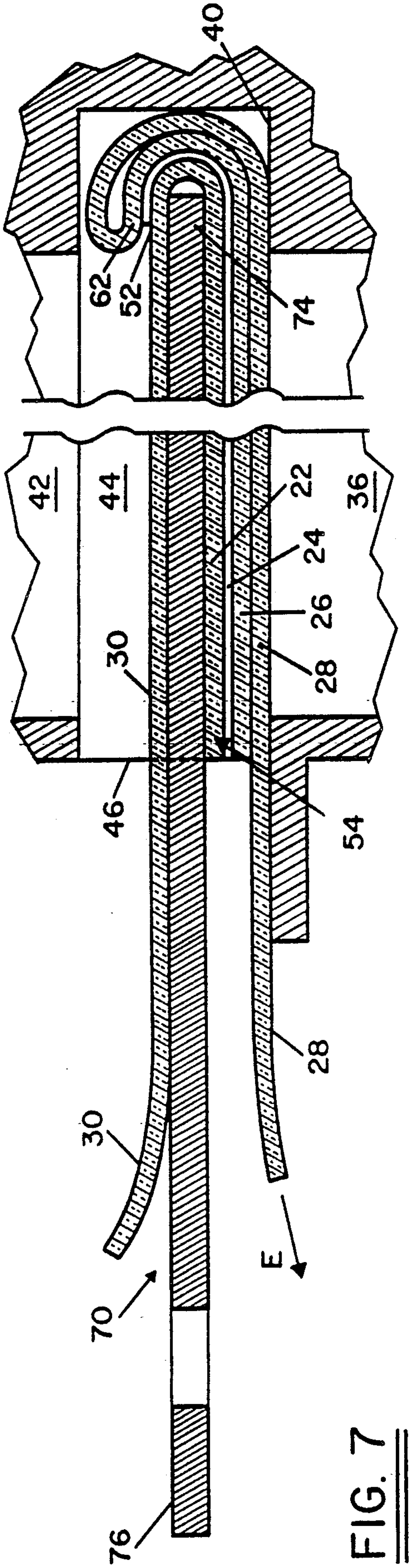
FIG. 7 is a partial view in longitudinal section taken along line 7—7 in FIG. 6 and drawn to an exaggerated vertical scale.
Figure 8:
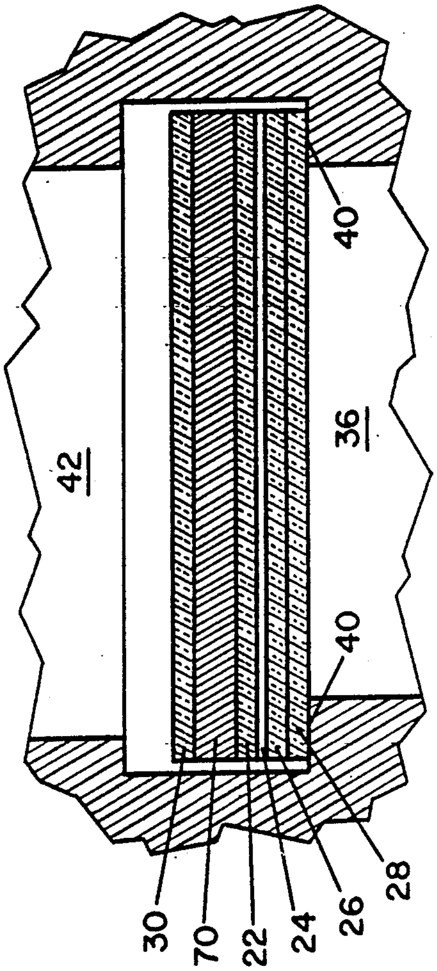
FIG. 8 is a partial view in transverse section taken along line 8—8 in FIG. 6 and drawn to an exaggerated vertical scale.
Figure 9:
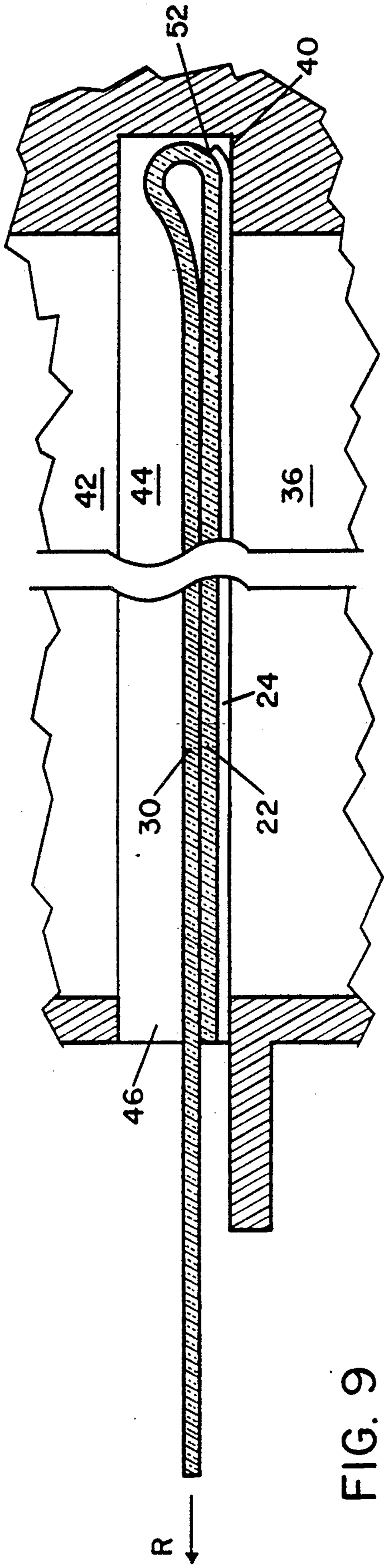
FIG. 9 is a partial view in longitudinal section similar to FIG. 7 but with the adhesive protecting sheet and the insertion tool removed according to the method of the invention.

The adhesive exposing member 28 comprises an elongated piece of material connected to the first end 60 of the adhesive protecting sheet 26 preferably along the entire first edge 62 of the adhesive protecting sheet. In the illustrated form of the invention the adhesive exposing member 28 is integrally formed with the adhesive protecting sheet 26 and comprises an extension of the protecting sheet having substantially the same width. Regardless of the width of adhesive exposing member 28 employed, the member is substantially longer than the adhesive protecting sheet 26 to which it is connected and, as show in FIGS. 3 and 4, is adapted to be folded back over the first end of the adhesive protecting sheet and to extend substantially past the second end 64 thereof. As shown in FIGS. 6 and 7, the adhesive exposing member 28 is adapted to extend out of the slot opening 46 when the sealing sheet 22 is placed in the inserted position in the toner bin slot 44, so that the free end of the adhesive exposing member may be grasped and pulled from the slot to peel the adhesive protecting sheet 26 back and expose the adhesive coating 24.

The illustrated preferred form of the invention also includes the sealing sheet removing member 30 connected to the insertion end 50 of the sealing sheet 22 preferably along its entire insertion edge 52. The sealing sheet removing member 30 may be any suitable thin flexible material, but is preferably integrally formed with the sealing sheet 22 and comprises an extension to the sealing sheet having the same width but being somewhat longer. As shown in FIGS. 6 and 7, the sealing sheet removing member 30 is long enough to be doubled or folded back over the insertion edge 52 of the sealing sheet 22 and to extend substantially out of the slot opening 46 when the sealing sheet is in the inserted position. Thus, the free end of the sealing sheet removing member 30 is exposed so that it may be grasped and pulled from the toner bin slot 44 to peel back the sealing sheet 22 from the container sealing surface 40 to break the seal and expose the toner in the toner container 36.

The method of providing a seal according to the invention over the toner container or hopper 36 of the toner bin 34 may be described with particular reference to FIGS. 3 through 9. The method of the invention includes inserting the sealing sheet 22 along with the attached adhesive coating 24 and the adhesive protecting sheet 26, into the toner bin slot 44 through the slot opening 46 until the sealing sheet is in its inserted position with the sealing side thereof facing the container sealing surface 40. Once the sealing sheet 22 is in the inserted position, the method includes peeling the adhesive protecting sheet 26 back and then pressing the sealing sheet and its adhesive coating 24 against the container sealing surface 40.

Since the sealing sheet 22 and other components of the preferred seal 20 are all made of thin flexible material, the preferred sealing sheet cannot be inserted into the narrow toner bin slot 44 without some added support. In the preferred method of the invention that added support is provided by an insertion tool 70 shown in FIGS. 3, 4, and 6 through 8. The insertion tool 70 is made of a thin but substantially rigid material such as a suitable metal and includes an insertion portion having substantially the same width and length as the sealing sheet 22 and also having a first end 74. The insertion tool 70 also includes a handle portion 76 connected to the end of the insertion portion opposite the first end thereof and being adapted to extend substantially from the slot opening 46 when the tool is completely inserted into the toner bin slot 44.

Referring particularly to FIGS. 3 and 4 the step inserting the sealing sheet 22 to the inserted position includes first positioning the seal on the insertion tool 70 so that the sealing sheet lies adjacent to the tool 70 and the sheet's insertion edge 50 is generally aligned with the first end 74 of the insertion tool and with the sealing side of the sealing sheet facing away from the insertion tool. Once the sealing sheet 22 is properly positioned on the insertion tool 70, the method includes folding the adhesive exposing member 28 back from the first edge 62 of the adhesive protecting sheet 26 so that the adhesive exposing sheet extends the length of the sealing sheet and substantially past the trailing edge 56 thereof. With the adhesive exposing member 28 folded back over the adhesive protecting sheet 26, the step of inserting the sealing sheet 22 to the inserted position in the toner bin slot 44 includes sliding the first end 74 of the insertion tool 70 into the slot through the slot opening 46 until the sealing sheet reaches the inserted position. The inserted position will generally be the point at which the insertion tool end 74 reaches the end of the slot opposite the slot opening.

As shown in FIGS. 3 and 4, at least a portion of the adhesive exposing member 28, and preferably a short portion (approximately 0.25 inches) of the sealing sheet 22, adhesive layer 24, and adhesive protecting sheet 26, is first folded back over the end 74 of the insertion tool 70 prior to folding the adhesive exposing member back over the adhesive protecting sheet. This folding over the end 74 of the insertion tool 70 serves to hold the insertion end 50 of the sealing sheet 22 in its proper position on the insertion tool 70 as the tool slides into the slot 44. Also, this step of folding the adhesive protecting sheet over the end 74 of the insertion tool 70 prevents the adhesive exposing member 28 from getting caught in the slot as the seal is being inserted and prematurely peeling the adhesive protecting sheet back to expose the adhesive.

Referring to FIG. 7, the step of peeling the adhesive protecting sheet 26 back includes holding the sealing sheet 22 in the inserted position with the insertion tool 70 while pulling the adhesive exposing member 28 back through the slot opening 4 with an adhesive exposing force in the direction indicated by arrow E. The step of pressing the sealing sheet 22 against the container sealing surface 40 is then preferably performed with the insertion tool 70, causing the sealing sheet to adhere to the container sealing surface and forming a secure releasable seal over the container opening 38. The insertion tool 70 may then be removed from the toner bin slot 44 leaving the sealing sheet 22 in the desired inserted and sealed position.

The preferred seal 20 according to the invention includes the sealing sheet removing member 30 connected to the insertion end 50 of the sealing sheet 22. With this preferred form of seal 20 the method of the invention includes folding the sealing sheet removing member 30 back over the end 74 of the insertion tool 70 prior to inserting the sealing sheet 22 into the toner bin slot 44. Since the sealing sheet removing member 30 is substantially longer than the sealing sheet 22, the folded sealing sheet removing member extends along the insertion tool 70 past the trailing end 54 of the sealing sheet. As shown in FIG. 7, the free end of the sealing sheet removing member 30 is thus exposed out of the slot opening 46 when the sealing sheet 22 is in the inserted position. This exposed end of the sealing sheet removing member 30 may be grasped and pulled with a sealing sheet removing force in the direction indicated by arrow R in FIG. 9 to peel the sealing sheet 22 from its inserted and sealed position to break the seal and expose the toner material (not shown) in the container 36. Where the sealing sheet removing member 30 is not used, the sealing sheet 22 itself must extend out of the slot opening 46 and the adhesive 24 is adapted to release as the exposed end is pulled.

The above described preferred embodiments are intended to illustrate the principles of the invention, but not to limit the scope of the invention. Various other embodiments and modifications to these preferred embodiments may be made by those skilled in the art without departing from the scope of the following claims. For example, the sealing sheet itself and the other seal components need not be formed from the preferred polyvinyl chloride plastic. Also, the step of inserting the sealing sheet on the insertion tool may include first tilting the toner bin somewhat depending on the particular type of cartridge. Tilting the cartridge and thus the container slot is particularly helpful when the container sealing surface is somewhat narrower along one side of the container opening as in the CANON EP, EPS, and PC type cartridges. With these types of cartridges it has been found that placing the sealing sheet of the invention in the proper inserted position is made substantially easier by tilting the cartridge such that the toner container sealing surface is inclined approximately 30 degrees to horizontal with the wider sealing surface below the narrower sealing surface.

I claim:

1. A seal for sealing a toner bin or the like having a container with a container opening, a container sealing surface extending around the container opening, and a bin cover structure connected to the container so as to form a toner bin slot between the bin cover structure and the container sealing surface having a slot opening extending along one side of the container, the seal comprising:

(a) a sealing sheet adapted to be inserted through the slot opening to an inserted position in which the sealing sheet completely covers the container opening and at least a portion of the container sealing surface around the entire perimeter of the container opening, the sealing sheet having an insertion edge adapted to be inserted through the slot opening and a trailing edge at the opposite end thereof, the trailing edge adapted to be positioned in the end of the toner bin slot having the slot opening when the sealing sheet is in the inserted position;

(b) an adhesive coating positioned on a sealing side of the sealing sheet on at least the portion of the sealing sheet adapted to cover the container sealing surface, the adhesive coating adapted to seal the sealing sheet to the container sealing surface;

(c) an adhesive protecting sheet secured over the adhesive coating on the sealing side of the sealing sheet and adapted to be peeled away from the adhesive coating leaving the adhesive material intact, the adhesive protecting sheet having a first edge generally aligned with the insertion edge of the sealing sheet and a second edge generally aligned with the trailing edge of the sealing sheet;

(d) a sealing sheet removing member connected to the insertion edge of the sealing sheet, the removing member having sufficient length to be folded back over the sealing sheet from its insertion edge so as to extend out of the slot opening when the sealing sheet is in the inserted position in the toner bin slot; and (e) an adhesive exposing member connected to the first edge of the adhesive protecting sheet, the adhesive exposing member having a length greater than the length of the adhesive protecting sheet between the first and second edges thereof to permit the adhesive exposing member to be folded over the adhesive protecting sheet from its first edge so as to extend out of the toner bin slot opening when the sealing sheet is in the inserted position.

2. The seal of claim 1 wherein the sealing sheet removing member is integrally formed with the sealing sheet and comprises an extension of the sealing sheet.

3. The seal of claim 2 wherein the sealing removing member is connected along the entire insertion edge of the sealing sheet.

4. The seal of claim 1 wherein the adhesive exposing member is integrally formed with the adhesive protecting sheet and comprises an extension of the adhesive protecting sheet.

5. The seal of claim 4 wherein the adhesive exposing member is connected along the entire first edge of the adhesive protecting sheet.

6. The seal of claim 2 wherein the sealing sheet and the sealing sheet removing member are comprised of a thin sheet of polyvinyl chloride material.

7. The seal of claim 4 wherein the adhesive protecting sheet and the adhesive exposing member are comprised of a thin sheet of polyvinyl chloride material.

8. The seal of claim 1 wherein the adhesive coating comprises a layer of low-track adhesive material applied by suitable means to the sealing side of the sealing sheet.

9. A seal for sealing a toner bin or the like having a container with a container opening, a container sealing surface extending around the entire perimeter of the container opening, and a bin cover structure connected to the container so as to form a toner bin slot between the bin cover structure and the container sealing surface having a slot opening extending along one side of the container, the seal comprising:

(a) a sealing sheet adapted to be inserted through the toner bin slot opening to an inserted position in which the sealing sheet completely covers the container opening and also covers at least a portion of the container sealing surface around the entire perimeter of the container opening, the sealing sheet having an insertion end adapted to be inserted through the slot opening and a trailing end, trailing end of the sealing sheet being adapted to be positioned in the end of the toner bin slot having the slot opening when the sealing sheet is in the inserted position;

(b) an adhesive coating positioned on a sealing side of the sealing sheet on at least the portion of the sealing sheet adapted to extend over the container sealing surface, the adhesive coating adapted to seal the sealing sheet to the sealing container surface when exposed thereto;

(c) an adhesive protecting sheet secured over the adhesive coating on the sealing side of the sealing sheet and adapted to be peeled away from the sealing sheet leaving the adhesive coating intact, the adhesive protecting sheet having a first end generally aligned with the insertion end of the sealing sheet and a second end generally aligned with the trailing end of the sealing sheet; and (d) adhesive exposing means connected to the first end of the adhesive protecting sheet and having a length greater than the length of the adhesive protecting sheet between the first and second ends thereof so as to permit the adhesive exposing means to be folded back over the adhesive protecting sheet and extend out of the toner bin slot opening when the sealing sheet is in the inserted position, the adhesive exposing means for peeling the adhesive protecting sheet from the sealing sheet to expose the adhesive coating in response to an adhesive exposing force applied at the portion of the adhesive exposing means extending out of the toner bin slot opening.

10. The seal of claim 9 further comprising:

(a) sealing sheet removing means connected to the insertion end of the sealing sheet and adapted extend out of the toner bin slot opening when the sealing sheet is in the inserted position within the toner bin, the sealing sheet removing means for peeling the sealing sheet from the toner bin sealing surface and pulling the sealing sheet through the slot opening in response to a sealing sheet removing force applied to the portion of the sealing sheet removing means extending out of the toner bin slot opening.

11. The seal of claim 10 wherein the adhesive exposing means comprises an extension to the adhesive protecting sheet adapted to be folded over the adhesive protecting sheet from the first end thereof so as to extend substantially out of the toner bin slot opening when the sealing sheet is in the inserted position.

12. The seal of claim 11 wherein the sealing sheet removing means comprises an extension to the sealing sheet adapted to be folded over the sealing sheet from the insertion end thereof so as to extend substantially out of the toner bin slot opening when the sealing sheet is in the inserted position.

13. A method of providing a seal against a sealing surface of a toner bin container which is covered by a container cover structure forming a toner bin slot extending between the container sealing surface and the container cover structure with a slot opening along one side of the container, the method comprising the steps of:

(a) inserting a sealing sheet into the toner bin slot through the slot opening to an inserted position with a sealing side of the sealing sheet facing at least a portion of the toner bin sealing surface along the entire length of the sealing surface, the sealing sheet having an adhesive coating positioned on the sealing side thereof with an adhesive protecting sheet positioned over the adhesive coating, and also having an insertion end adapted to be positioned in the opposite end of the toner bin slot from the slot opening when the sealing sheet is in the inserted position;

(b) peeling the adhesive protecting sheet back from the insertion end of the sealing sheet with an adhesive exposing member connected to the adhesive protecting sheet at the insertion end thereof and the adhesive exposing member extending out of the toner bin slot through the slot opening; and (c) pressing the sealing sheet against the sealing surface along its entire length to cause the adhesive material to form a seal between the toner bin sealing surface and the sealing sheet.

14. The method of claim 13 further including the steps of:

(a) positioning the sealing sheet on an insertion tool so that the insertion end of the sealing sheet aligns with a first end of the insertion tool and the sealing side of the sealing sheet faces away from the insertion tool, the insertion tool being adapted to be inserted into the toner bin slot through the slot opening and comprising a thin piece of substantially rigid material having a width substantially similar to that of the sealing sheet but being longer than the sealing sheet and including a handle portion at the end opposite the first end thereof; and (b) folding the adhesive exposing member back over the adhesive protecting sheet so that the adhesive exposing member extends along the insertion tool from the first end thereof and least partially along the handle portion of the insertion tool so that when the sealing sheet and insertion tool are positioned within the slot in the inserted position, at least a portion of the adhesive exposing member extends out of the slot opening, and (c) wherein the step of inserting the sealing sheet includes sliding the first end of the insertion tool, with the sealing sheet and folded adhesive exposing member positioned thereon, into the toner bin slot through the slot opening until the sealing sheet is in the inserted position.

15. The method of claim 14 wherein the step of folding the adhesive exposing member includes:

(a) first folding a portion of the adhesive exposing member over the first end of the insertion tool to the side of the tool opposite to the side on which the sealing sheet is positioned.

16. The method of claim 15 wherein the step of peeling the adhesive protecting sheet includes:

(a) pulling the adhesive exposing member out of the slot through the slot opening from which it extends after the sealing sheet is placed in the inserted position and retained in the inserted position with the insertion member.

17. The method of claim 16 wherein the step of pressing the sealing sheet against the sealing surface is performed with the insertion tool after the adhesive protecting sheet is peeled back from the adhesive coating on the sealing sheet.

18. The method of claim 17 wherein the sealing sheet includes a sealing sheet removing member connected to the insertion end of the sealing sheet, and the step of inserting the sealing sheet includes:

(a) folding the sealing sheet removing member over the first end of the insertion tool so that the sealing sheet removing member extends substantially the length of the insertion tool and extends out of the slot opening when the sealing sheet is inserted with the insertion tool to the inserted position.

19. The method of claim 18 including the step of:

(a) removing the insertion member from the toner bin slot through the slot opening leaving the sealing sheet sealed to the container sealing surface and the sealing sheet removing member folded back over the side of the sealing sheet opposite the sealing side thereof and extending out of the slot opening so that the sealing sheet may be removed easily by pulling sealing sheet removing member out of the slot through the slot opening.

* * * * *

UNITED STATES PATENT AND TRADEMARK OFFICE

CERTIFICATE OF CORRECTION

PATENT NO. : 5,080,745

DATED : January 14, 1992

INVENTOR(S) : Leslie Paull

It is certified that error appears in the above-identified patent and that said Letters Patent is hereby corrected as shown below:

In Claim 3, Column 9, line 51 of the Patent, before "removing" add --sheet--.

Signed and Sealed this

Twenty-third Day of March, 1993

*Attest:*

STEPHEN G. KUNIN

*Attesting Officer*

*Acting Commissioner of Patents and Trademarks*